(12) United States Patent
Boudyaf et al.

(10) Patent No.: US 7,936,082 B2
(45) Date of Patent: May 3, 2011

(54) ELECTRICAL POWER SUPPLY CIRCUIT IN AN AIRCRAFT FOR ELECTRICAL EQUIPMENT INCLUDING A DE-ICING CIRCUIT

(75) Inventors: Rachid Boudyaf, Alfortville (FR); Antoine Jean-Baptiste Stutz, Montrouge (FR)

(73) Assignee: Hispano Suiza, Colombes (FR)

( * ) Notice: Subject to any disclaimer, the term of this patent is extended or adjusted under 35 U.S.C. 154(b) by 629 days.

(21) Appl. No.: 12/022,492

(22) Filed: Jan. 30, 2008

(65) Prior Publication Data

US 2010/0283319 A1 Nov. 11, 2010

(30) Foreign Application Priority Data

Jan. 31, 2007 (FR) ..................................... 07 52986

(51) Int. Cl.
*B60L 1/00* (2006.01)
(52) U.S. Cl. ...................... 307/9.1; 219/202; 244/134 D
(58) Field of Classification Search .................. 307/9.1; 219/202; 244/134 R, 134 D
See application file for complete search history.

(56) References Cited

U.S. PATENT DOCUMENTS

| 2,566,618 | A | | 9/1951 | Lindsey | |
|---|---|---|---|---|---|
| 4,410,794 | A | * | 10/1983 | Williams | 219/486 |
| 4,473,752 | A | * | 9/1984 | Cronin | 290/38 R |
| 5,929,537 | A | * | 7/1999 | Glennon | 307/46 |
| 6,906,479 | B2 | * | 6/2005 | Xu et al. | 318/140 |
| 6,992,403 | B1 | * | 1/2006 | Raad | 307/47 |
| 2005/0273206 | A1 | * | 12/2005 | McGinley | 700/291 |

FOREIGN PATENT DOCUMENTS

| FR | 2 281 273 | 3/1976 |
|---|---|---|
| WO | WO 97/00201 | 1/1997 |
| WO | WO 03/078248 A1 | 9/2003 |

* cited by examiner

*Primary Examiner* — Fritz M Fleming
*Assistant Examiner* — Daniel Cavallari
(74) *Attorney, Agent, or Firm* — Oblon, Spivak, McClelland, Maier & Neustadt, L.L.P.

(57) ABSTRACT

An electrical power supply circuit in an aircraft is disclosed. The circuit includes an electricity distribution network on board the aircraft for powering electrical equipment situated in an engine of the aircraft or in the surroundings of the engine, and a power supply generator integrated in the engine of the aircraft for powering a de-icing circuit. The electrical equipment includes nacelle loads connected to a DC voltage distribution bus which is connected to a voltage converter circuit powered by the distribution network. The de-icing circuit includes at least one electrical resistance for dissipating electricity returned to the DC voltage distribution bus by at least some of the nacelle loads.

9 Claims, 2 Drawing Sheets

ELECTRICAL POWER SUPPLY CIRCUIT IN AN AIRCRAFT FOR ELECTRICAL EQUIPMENT INCLUDING A DE-ICING CIRCUIT

BACKGROUND OF THE INVENTION

The invention relates to supplying electricity to electrical equipment in an aircraft engine and/or its surroundings.

The field of application of the invention is more particularly that of airplane engines, in particular gas turbine engines. Nevertheless, the invention is also applicable to helicopter engines.

The term "electrical equipment in an aircraft engine or in its surroundings" is used herein to cover not only electrical equipment that is useful for enabling the engine to operate, but also electrical equipment associated with the engine nacelle, such as, for example, de-icing or anti-icing electrical circuits such as circuits for nacelle anti-icing (NAI) or actuators for use in a thrust-reverse cowl opening system (TRCOS) or electromechanical actuators for use in electrical thrust-reverse actuation control (ETRAC) for a gas turbine airplane engine, or even circuits associated with the wing carrying the engine, such as, for example, airplane wing de-icing or anti-icing electrical circuits.

A traditional scheme for producing and distributing electricity from a gas turbine airplane engine is shown in FIG. 3.

Two generators 111a, 111b (or more than two for the purposes of redundancy or of optimizing the generation of electricity, depending on the application under consideration) are mounted on an accessory gearbox 113 that is mechanically coupled to a turbine shaft of the engine. The generators 111a, 111b are typically starter/generators (S/G) comprising a synchronous generator that is associated with excitation and that delivers an alternating voltage at a frequency that varies as a function of engine speed, the exciter assembly and the synchronous generator being controlled to operate in a synchronous motor mode when starting the turbine.

The alternating voltages delivered by the generators 111a, 111b are conveyed by lines 115a, 115b to an electrical network 117 for distributing electricity on board the airplane, referred to as the "on-board network". A circuit 119 of the on-board network and connected to the lines 115a, 115b delivers alternating current (AC) at a regulated alternating voltage, typically at 115 volts AC (Vac) or 230 Vac, on one or more distribution buses. The circuit 119 also powers a voltage converter 121 that delivers a regulated direct current (DC) voltage, typically 270 volts DC (Vdc) or ±270 Vdc on one or more buses. The voltages delivered by the circuits 119 and 121 power different electrical loads on board the airplane, mainly in the fuselage zone thereof.

Associated with the engine, a full authority engine control unit (ECU) 143 is powered by a generator 127 such as a permanent magnet generator or permanent magnet alternator (PMA) mounted on the gearbox 113. The ECU 143 is also connected to one of the circuits 119, 121 e.g. the regulated alternating voltage circuit 119, so as to enable it to be powered properly so long as the engine has not reached a speed that is sufficient for enabling the PMA 127 to deliver the required electricity, or in the event of the PMA failing. The ECU 143 makes use of the electricity it receives for enabling its components to operate and for exciting various elements of the engine such as sensors or probes, actuators or servo-valves that require limited amounts of electrical power.

At present, there is a trend towards replacing hydraulic energy more and more with electrical energy for actuating various pieces of electrical equipment in an aircraft engine or in its environment. For example, some airplanes are fitted with electrically-actuated thrust reversers 147. Thus, the circuit includes AC/DC converters 133 having inputs connected to the on-board network 117 via electrical power supply lines 145, 149, 151 and having outputs connected to such an electrical thrust reverser 147 and also to static equipment, such as circuits 153, 155 for de-icing the engine nacelle and the wing carrying the engine.

The delivery of electricity from the network on board the aircraft to the various loads external to the fuselage by means of power supply lines which need to be made very safe and to be insulated lines represent weight and bulk that are considerable, running the risk of becoming dimension-determining or even prohibitive if the amount of equipment to be powered increases, and the delivery itself presents electrical losses that are not negligible.

OBJECT AND SUMMARY OF THE INVENTION

An object of the invention is to provide an electrical power supply circuit that does not present such a drawback and that enables a plurality of pieces of electrical equipment to be powered in an aircraft engine and/or in its surroundings.

This object is achieved by an electricity power supply circuit in an aircraft, the circuit comprising a network for distributing electricity on board the aircraft and powering electrical equipment situated in an engine of the aircraft or in the environment of said engine, said electrical equipment comprising nacelle loads connected to a DC voltage distribution bus, said bus being connected to a voltage converter circuit powered by said distribution network, and the power supply circuit further including a power supply generator integrated in the aircraft engine to power a de-icing circuit, said de-icing circuit comprising at least one electrical resistance for dissipating electricity possibly returned to the DC voltage distribution bus by at least some of the nacelle loads.

The circuit of the invention thus makes it possible to reduce the length of cable for conveying electricity to the de-icing circuit. Furthermore, the cable conveying electricity from the electricity distribution network on board the airplane may be of small diameter. This makes it possible to optimize the weight and the bulk of the cables. In addition, the de-icing circuit does not impose any particular regulation constraints and consequently the power supply generator may be of a configuration that is simple, robust, compact, and light in weight. Furthermore, there is no need to have an electrical resistance to be dedicated solely to dissipating the electricity that can be returned to the DC electricity distribution bus by the electrical actuators in the nacelle. This further reduces weight and enables electricity to be saved.

Advantageously, said de-icing circuit is connected directly to said power supply generator to receive an alternating voltage.

The circuit of the invention thus enables the de-icing circuit (which is purely resistive) to receive an alternating voltage without the alternating voltage being transformed into a DC voltage, thus enabling power losses to be reduced and reducing the size and the weight of the circuit.

According to another feature of the present invention, said power supply generator is a dedicated wound-rotor generator.

The power supply generator is thus simple and robust.

Advantageously, the power supply circuit includes a permanent magnet generator (PMA) mechanically coupled to said power supply generator, said permanent magnet generator being designed to power at least one engine control unit (ECU) for electronically regulating the engine.

Thus, the permanent magnet generator (PMA) powering the engine control unit (ECU) for electronically regulating the engine is shared with the generator powering the de-icing circuit.

The at least one engine control unit (ECU) is advantageously connected to said permanent magnet generator to receive an alternating voltage. This enables the circuit to be simplified.

Advantageously, said permanent magnet generator powers a plurality of engine control units, the units being for example powered via interface means.

According to a feature of the present invention, the power supply generator is a wound-rotor machine and said permanent magnet generator corresponds to a permanent magnet stage of said wound-rotor machine. It is thus possible to save on one outlet shaft from the accessory gearbox.

Advantageously, the power supply circuit includes:
an input connected to the electricity distribution network to receive an alternating voltage, said voltage converter being connected to said input to convert the alternating voltage supplied by the electricity distribution network into a DC voltage; and
a switch for delivering a voltage delivered by said converter to the DC voltage distribution bus.

The circuit thus makes it possible to have a secure electricity node available in the vicinity of the engine for powering loads integrated in the engine or situated in its vicinity, with only one link to the electricity network on board the aircraft sufficing to ensure that electricity is available on the electricity network of the engine. Furthermore, the converter can be dimensioned for all of the electrical equipment with the exception of the de-icing equipment, thereby reducing the size of the converter.

The invention also provides an aircraft including a power supply circuit as defined above.

BRIEF DESCRIPTION OF THE DRAWINGS

The invention can be better understood on reading the following description given by way of non-limiting indication and with reference to the accompanying drawings, in which.

DETAILED DESCRIPTION OF EMBODIMENTS OF THE INVENTION

Figure 1:
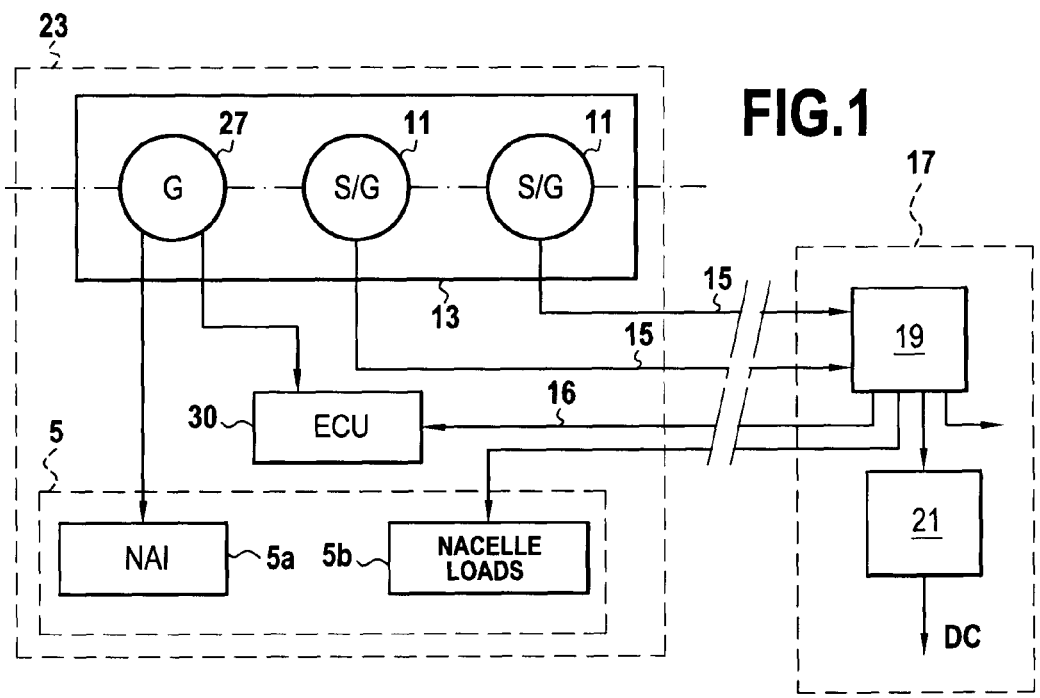
FIG. 1 is a highly diagrammatic view of a system of the invention for electrically powering and controlling equipment in an aircraft engine and in its surroundings.
Figure 3:
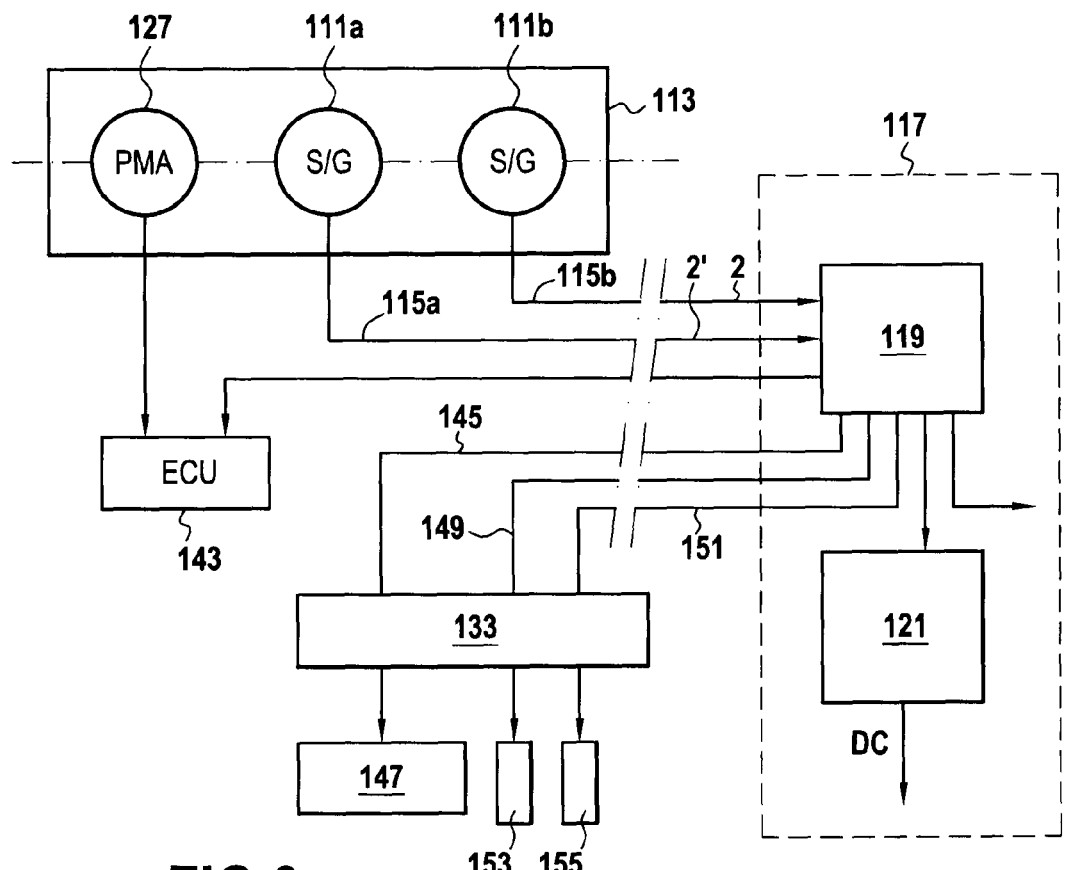
FIG. 3, described above, is a highly diagrammatic representation of a known scheme for producing and distributing electricity in an aircraft.

FIG. 1 is a circuit diagram for electrically powering and controlling a set 5 of pieces of electrical equipment 5a and 5b in an aircraft engine and in its surroundings, in particular in association with a gas turbine airplane engine.

The circuit of FIG. 1 comprises at least one generator 11 such as an S/G mounted on an accessory gearbox (represented by 13) that is mechanically coupled to a turbine shaft of the engine (not shown). The alternating voltage delivered by the S/G generator(s) 11 is conveyed by one or more lines 15 to an electrical network 17 for distributing electricity on board the airplane, referred to as the "on-board network". A circuit 19 of the on-board network supplies one or more distribution buses with an alternating voltage that is typically regulated at 115 Vac or 230 Vac and at a frequency that varies as a function of the speed of rotation of the turbine shaft. The circuit 19 may also power a voltage converter circuit 21 for delivering a regulated DC voltage, typically 270 Vdc or ±270 Vdc on one or more buses. The voltages produced by the circuits 19 and 21 power various loads in the fuselage zone of the airplane.

In accordance with the invention, the power supply circuit comprises, in association with the engine (represented by 23), a power supply generator 27 integrated in the airplane engine to power a circuit 5a for engine nacelle anti-icing (NAI) or de-icing, or a circuit for de-icing a wing carrying the engine.

This makes it possible to shorten the length of the cable conveying electricity to the de-icing circuit 5a. It should be observed that the cable connected to the resistive de-icing circuit 5a is of a diameter that is large compared with the diameters of cables connected to other pieces of electrical equipment. Thus, reducing the length of a cable of this kind serves to reduce the weight and the bulk of the cables needed for conveying electricity to loads that are external to the fuselage. In addition, since the de-icing circuit 5a is purely resistive, it does not require any particular regulation constraints and consequently the power supply generator 27, e.g. a generator of the type having a dedicated wound rotor, may present a configuration that is simple, robust, compact, and of small weight.

Furthermore, the de-icing circuit 5a may be connected directly to the power supply generator 27 in order to receive an alternating voltage. There is thus no need to have a voltage converter for transforming the alternating voltage into a DC voltage. This serves to reduce power losses and to reduce the size and the weight of the power supply circuit.

In addition, at least one engine control unit (ECU) 30 is also connected to the power supply generator 27.

Advantageously, the ECU 30 receives an alternating voltage from the power supply generator 27. This generator delivers AC to the ECU 30 that may be regulated or variable as a function of engine speed. Furthermore, the ECU 30 can also be connected to the AC voltage circuit 19 by a line 16 so as to enable it to be powered properly until the engine has reached a speed that is sufficient to enable the power supply generator 27 to deliver the required electrical power. Furthermore, the circuit 19 also powers an electrical equipment set 5b corresponding to loads in the nacelle.

Figure 2:
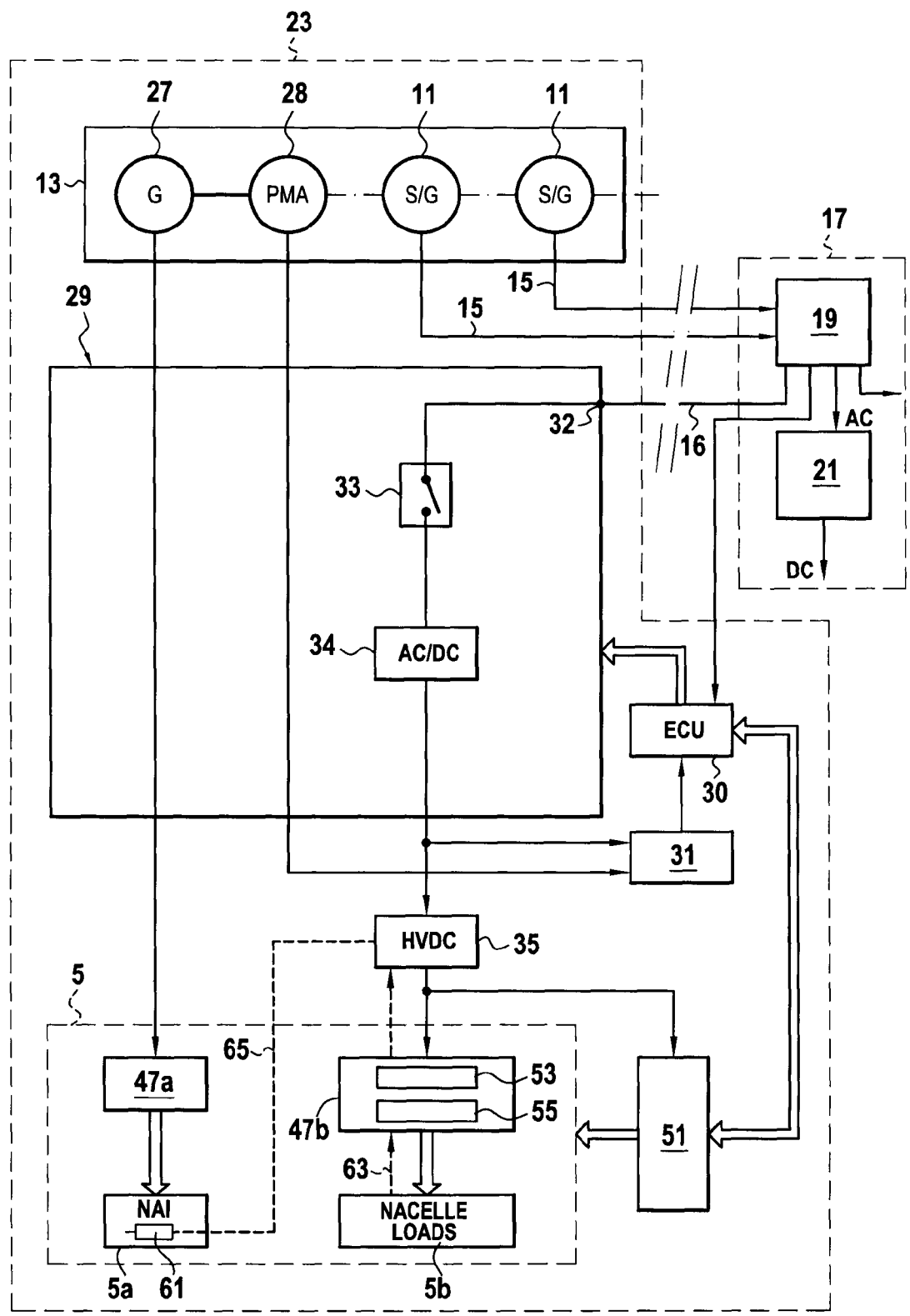
FIG. 2 is a more detailed view of an equipment of a electrical power supply device of FIG. 1.

FIG. 2 shows an embodiment of the electrical power supply circuit of the invention in greater detail.

In this example, the power supply circuit comprises a permanent magnet generator 28 (PMA) mechanically coupled to the power supply generator 27. The permanent magnet generator 28, which is associated with the power supply generator 27, is designed to power one or more ECUs 30. More particularly, the permanent magnet generator 28 powers the ECUs 30 via interface circuit 31.

By way of example, in order to save on an outlet shaft from the accessory gearbox, the power supply generator 27 is a wound-rotor machine and the permanent magnet generator 28 corresponds to a permanent magnet stage of this wound-rotor machine.

Furthermore, the power supply circuit includes a high-voltage direct current (HVDC) bus 35 for distributing a DC voltage and a secure power supply device 29 forming part of the electricity distribution network associated with the engine (represented by 23).

The power supply device 29 has an input 32, a switch 33 and an AC/DC voltage converter 34.

The input 32 is connected to the electricity distribution network 17, and more particularly to the circuit 19, in order to receive an alternating voltage. The voltage converter 34 is connected to the input 32 for the purpose of converting the alternating voltage delivered by the electricity distribution network 17 into a DC voltage. Furthermore, the switch 33 enables delivering a voltage from the converter 34 to the DC distribution bus 35.

Thus, the power supply generator 27 delivers AC electrical power to the ECU 30, which power is regulated or variable as a function of engine speed. Furthermore, the switch 33 enables the ECU 30 to be connected via the power supply device 29 and interface circuit 31 to the alternating voltage circuit 19 by the line 16 in order to be powered correctly until the engine has reached a speed that is sufficient to enable the required electricity to be delivered by the power supply generator 27.

This configuration thus makes available a secure electrical power supply node. The power supply generator 27 delivers an alternating voltage directly to equipment 5a for de-icing the engine nacelle or the wing. In contrast, that portion of the electrical equipment that corresponds to nacelle loads 5b is connected to the DC voltage distribution bus 35.

More particularly, the de-icing circuit(s) 5a is/are connected to the power supply generator 27 via a de-icing power supply module 47a that includes a switch and protection device controlled by a central control unit 51 and/or by the ECU 30.

The de-icing circuit 5a also includes at least one electrical resistance 61 for dissipating the electricity that can be returned to the DC distribution bus 35 by at least some of the nacelle loads 5b. The possible return of electricity to the DC distribution bus 35 is represented by reference 63. The dissipation of this electrical energy by the electrical resistance 61 is made possible by a connection 65 between the DC voltage distribution bus 35 and the electrical resistance 61.

Furthermore, the bus 35 powers a nacelle power supply module 47b together with a control device including the central control unit 51.

In this example, the power supply modules 47a, 47b are controlled by the central control unit 51. It is connected to sensors (not shown) associated with at least some of the electrical equipment and it is also connected to the ECU 30. The nacelle power supply module 47b is associated with electrical equipment 5b in the nacelle.

The nacelle power supply module 47b comprises an inverter 53 and a switch circuit 55. The inverter 53 serves to deliver an alternating voltage to the electrical equipment 5b, which alternating voltage is obtained from the DC voltage delivered by the bus 35, while the switch circuit 55 serves to activate the pieces of electrical equipment 5b. The central control unit 51 controls the module 47b and in particular the switch circuit 55 so as to activate each piece of equipment 5b as a function of information received from the ECU 30 and/or the sensors associated with the equipment 5b.

It should be observed that the power supply circuit may include two power supply electricity generators 27 and possibly two DC distribution buses 35, e.g. of the high voltage DC (HVDC) type.

Thus, the use of two generators makes it possible to mitigate the failure of one generator while conserving a power supply that is made secure by the connection 16 to the network on board the airplane, and also makes it possible to share the electrical power that is delivered.

The DC voltage delivered on the bus 35 (or possibly the buses 35) may be a regulated voltage, e.g. regulated to a nominal value of 270 Vdc or ±270 Vdc, with regulation being provided by the AC/DC converter circuit. In a variant, the DC voltage delivered via the bus(es) 35 need not be regulated, with a range of variation about a nominal value then being acceptable, in particular as a function of variations in the voltages delivered by the circuit 19.

The invention also provides an aircraft including an electricity power supply circuit comprising an electricity distribution network 17 on board the aircraft powering electrical equipment 5b situated in the aircraft engine or in the surroundings of the engine, and a power supply generator 27 integrated in the aircraft engine for powering a de-icing circuit 5a.

What is claimed is:

1. An electricity power supply circuit in an aircraft, the circuit comprising:
   at least one first power supply generator mechanically coupled to an engine of the aircraft for delivering an alternating voltage;
   a distribution network connected to said at least one generator to receive said alternating voltage for distributing electricity on board the aircraft and powering electrical equipment situated in the engine of the aircraft or in the environment of said engine;
   a DC voltage distribution bus connected to a voltage converter circuit powered by said distribution network, the electrical equipment comprising nacelle loads connected to said DC voltage distribution bus;
   a second power supply generator integrated in the aircraft engine and connected to a circuit for de-icing the engine nacelle or a wing carrying the engine, the power from the second power supply generator being fed to the de-icing circuit without transiting through said distribution network; and
   a connection between said DC voltage distribution bus and at least one electrical resistance included in said de-icing circuit for dissipating within said resistance electricity returned to the DC voltage distribution bus by at least some of the nacelle loads.

2. A power supply circuit according to claim 1, wherein said second power supply generator is a dedicated wound-rotor generator.

3. A power supply circuit according to claim 1, further comprising a permanent magnet generator mechanically coupled to said second power supply generator, said permanent magnet generator being designed to power at least one engine control unit for electronically regulating the engine, the power from the permanent magnet generator being fed to the engine control unit without transiting through said distribution network.

4. A power supply circuit according to claim 3, wherein the power supply generator is a wound-rotor machine and said permanent magnet generator corresponds to a permanent magnet stage of said wound-rotor machine.

5. A power supply circuit according to claim 1, further comprising:
   an input connected to the electricity distribution network to receive an alternating voltage, said voltage converter being connected to said input to convert the alternating voltage supplied by the electricity distribution network into a DC voltage; and
   a switch for delivering a voltage delivered by said converter to the DC voltage distribution bus.

6. An aircraft including the electrical power supply circuit according to claim 1.

7. A power supply circuit according to claim 1, further comprising a de-icing power supply module which connects the second power supply generator and the de-icing circuit, the de-icing power supply module includes a switch and protection device.

8. A power supply circuit according to claim 7, further comprising a nacelle power supply module which connects the DC voltage distribution bus and the electrical equipment comprising nacelle loads, the nacelle power supply module including an inverter which delivers alternating voltage to the electrical equipment and a switch circuit which activates pieces of the electrical equipment.

9. A power supply circuit according to claim 8, further comprising a central control unit which controls the de-icing power supply module and the nacelle power supply module.

* * * * *